Inventor
F. C. Jearum
By Hascock Downing & Seebold
Attys

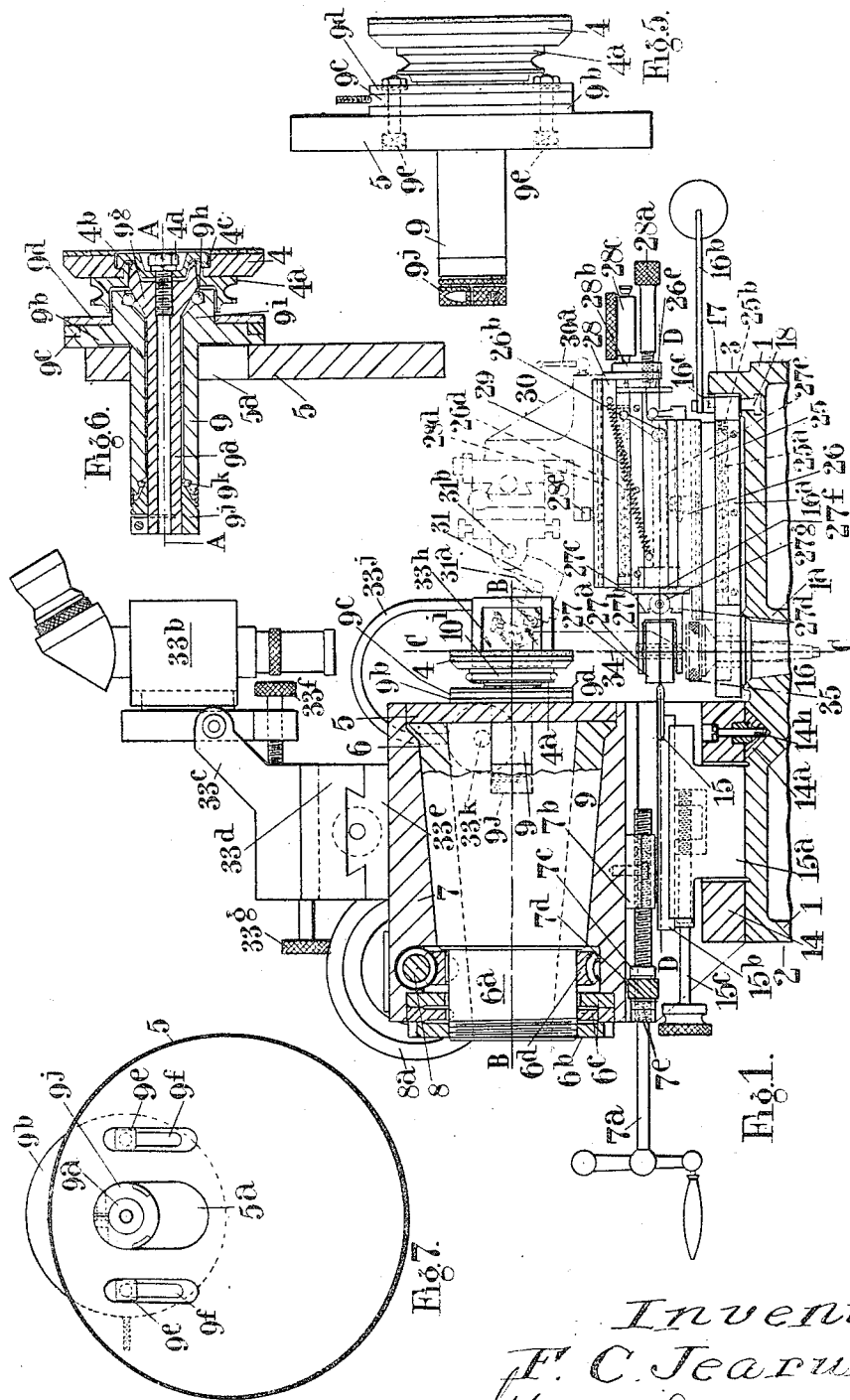

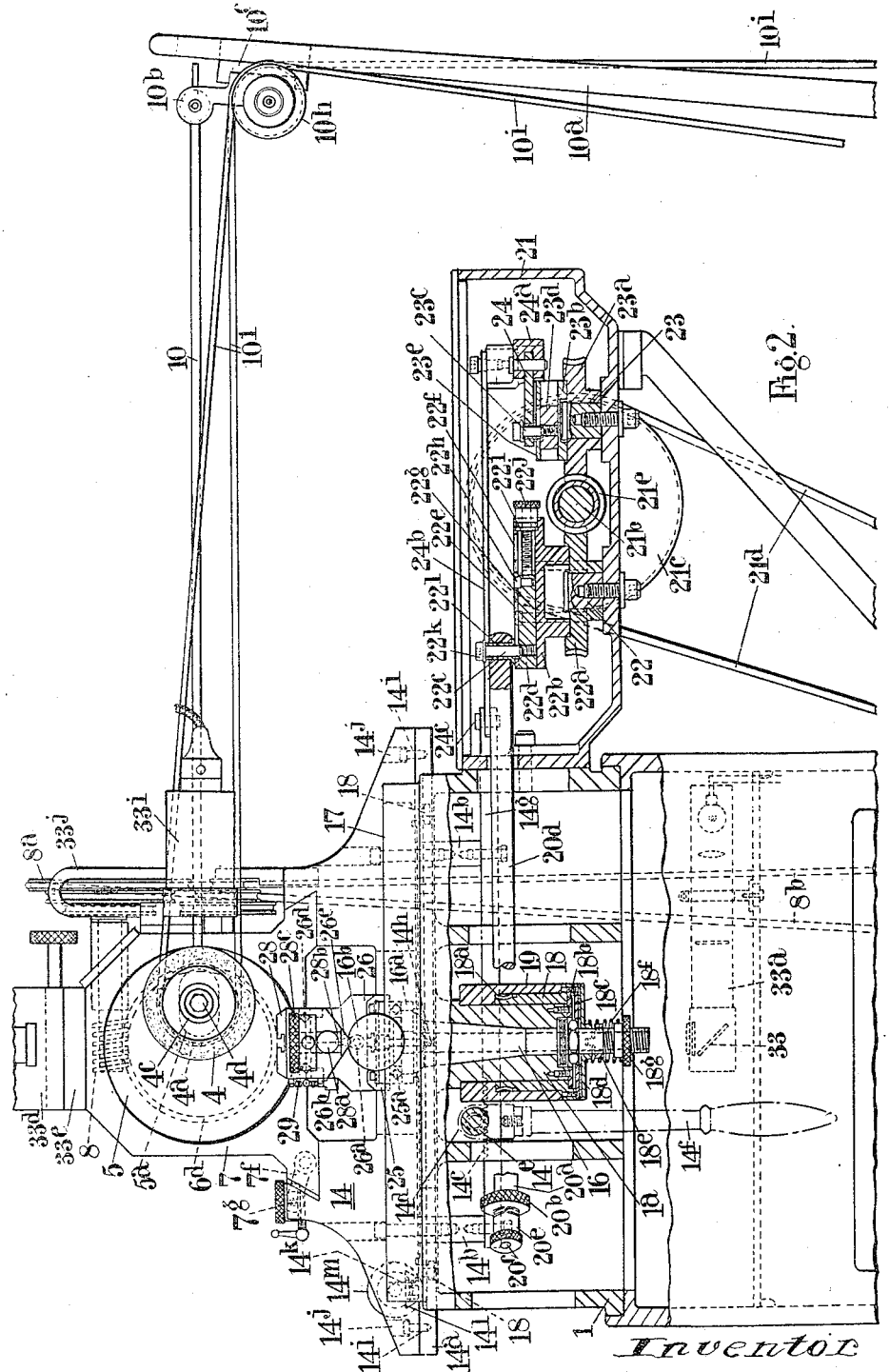

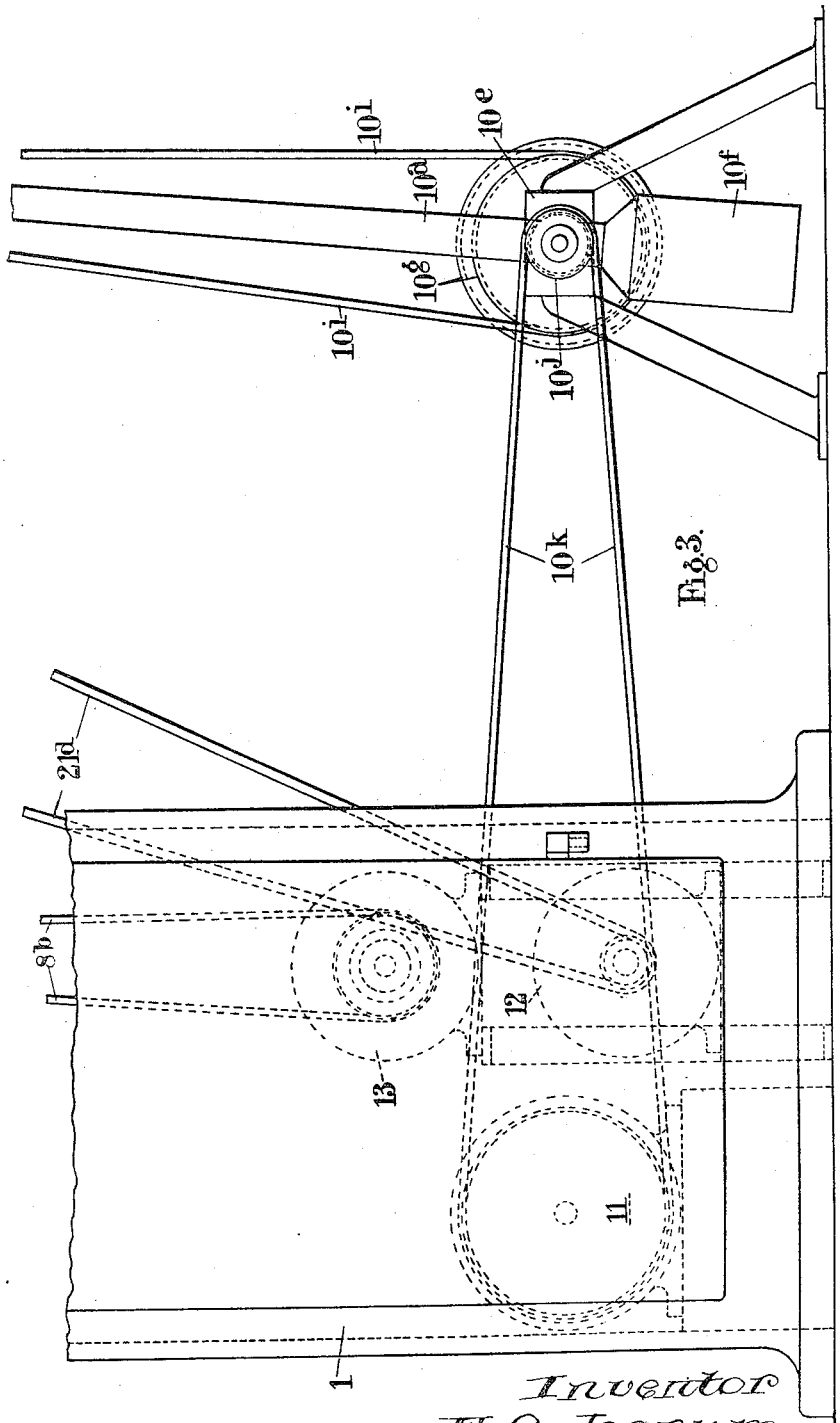

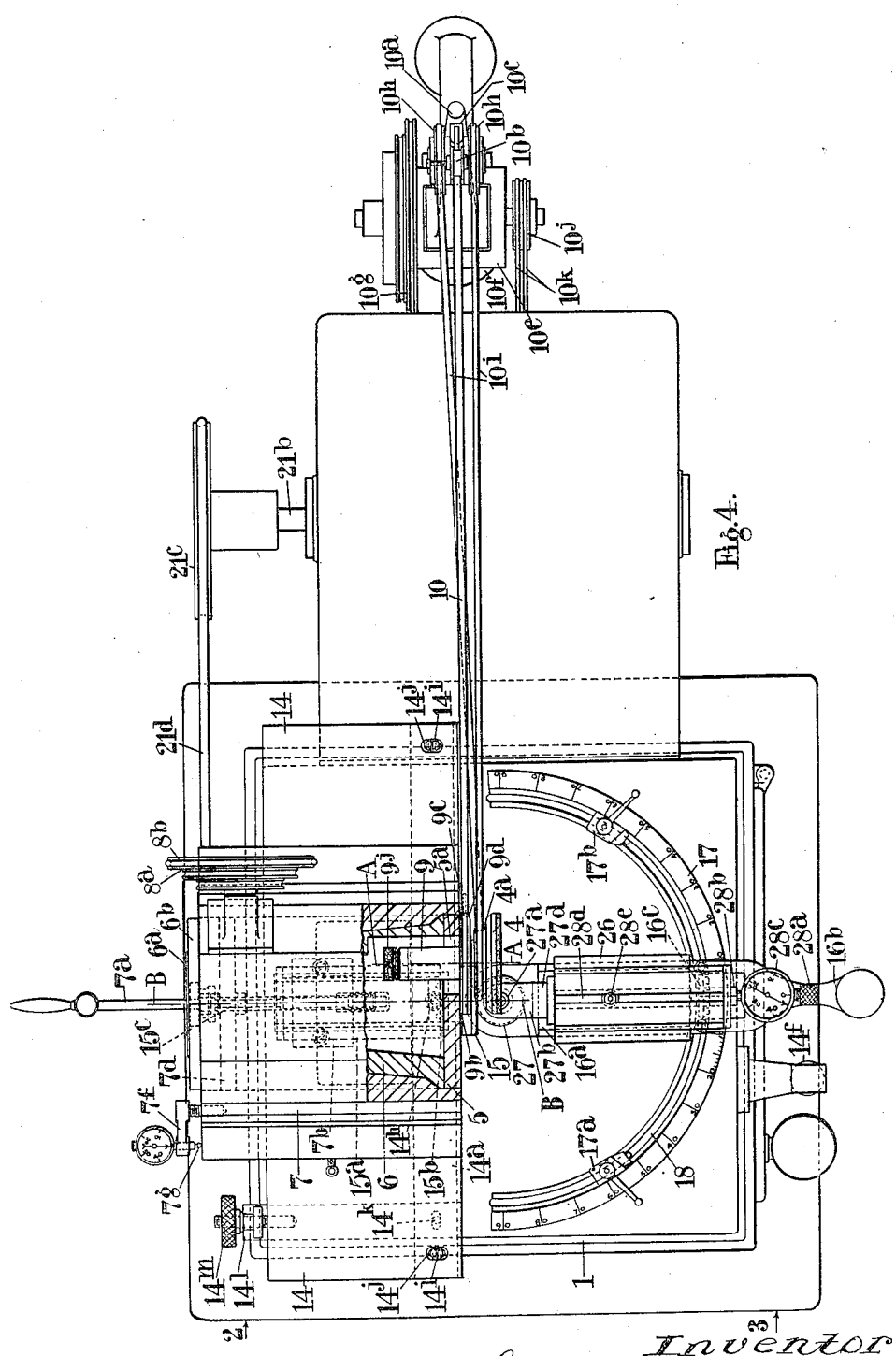

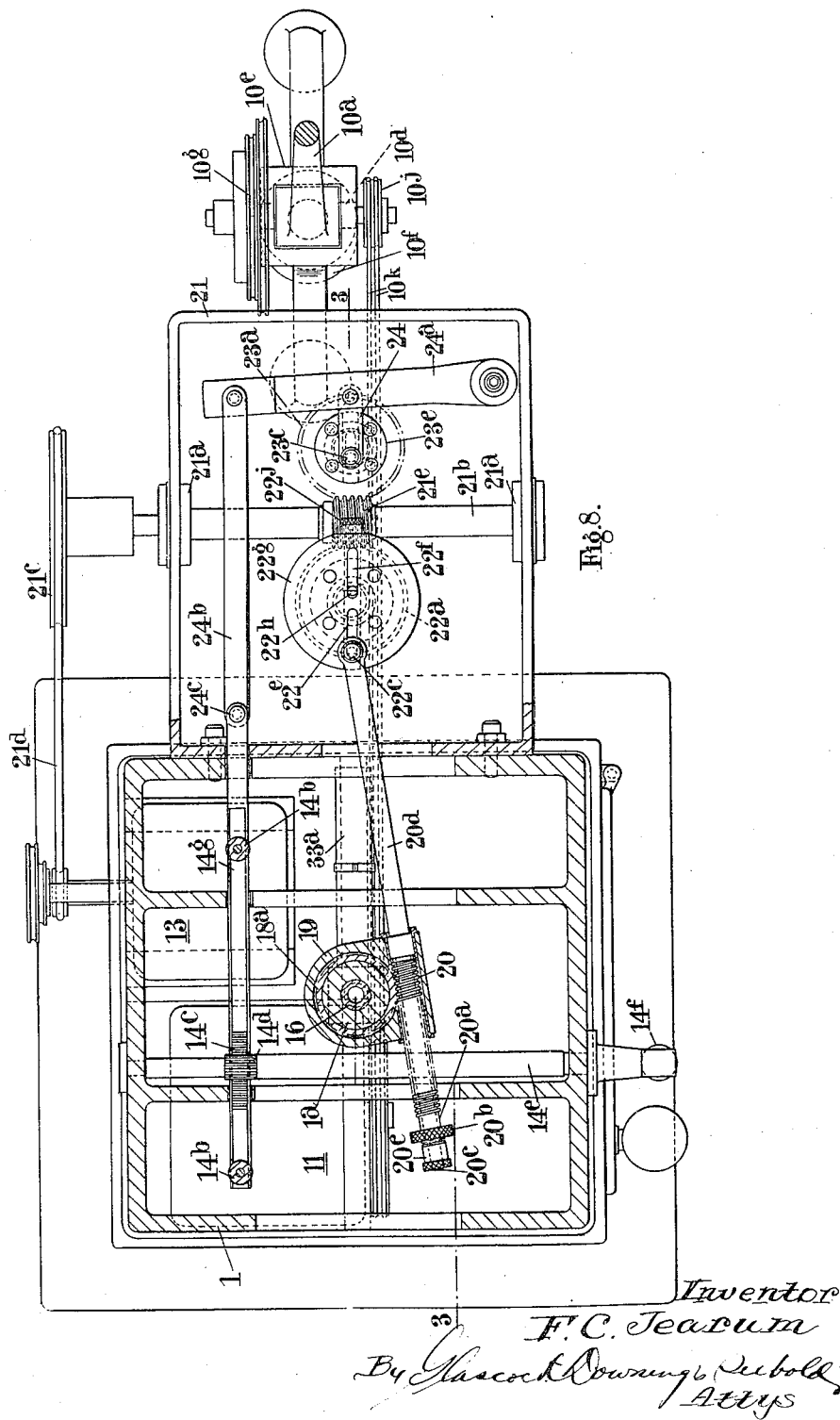

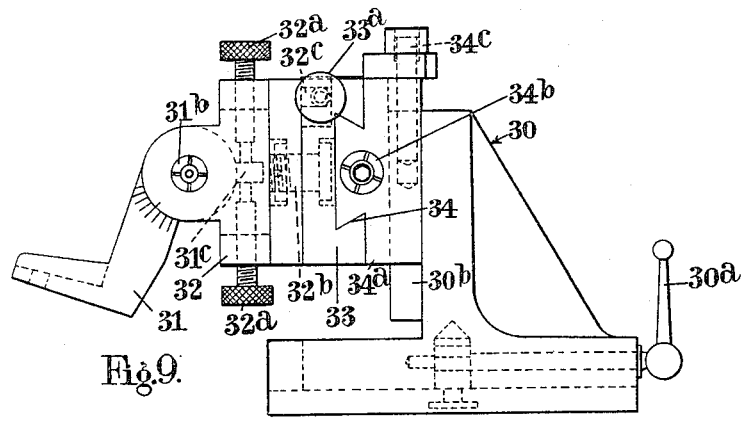
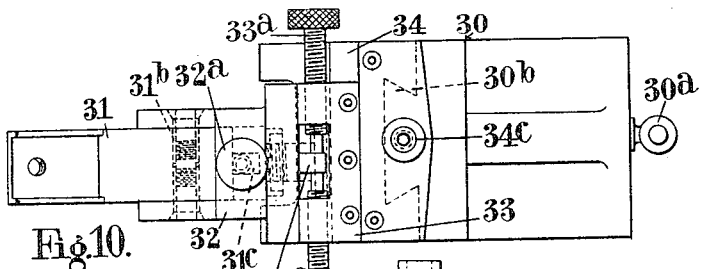
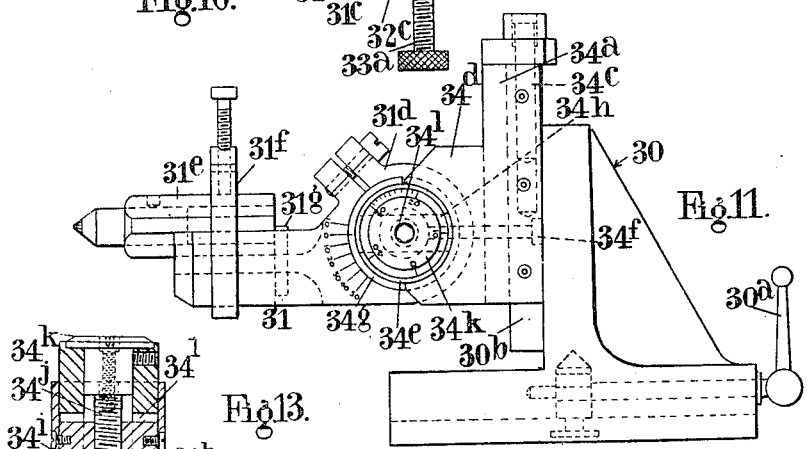
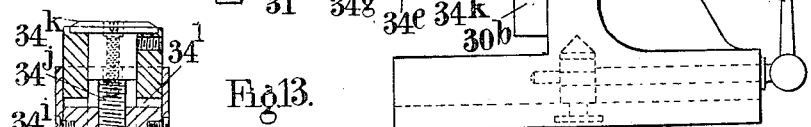
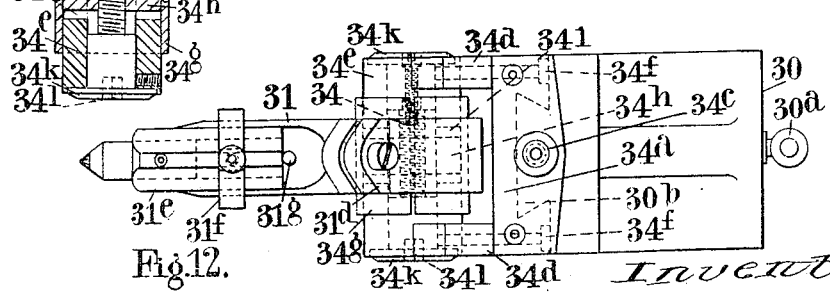

Patented Sept. 4, 1945

2,384,253

UNITED STATES PATENT OFFICE 2,384,253

CUTTING, GRINDING, OR POLISHING MACHINE FOR DIAMONDS OR OTHER STONES AND THE LIKE

Frederick Charles Jearum, Sutton, England

Application May 27, 1943, Serial No. 488,783
In Great Britain May 19, 1942

20 Claims. (Cl. 51—120)

This invention relates to machines or mechanism for cutting, grinding, lapping or polishing (hereinafter referred to as cutting) diamonds or other stones or minerals or hard metals or tool metals for industrial tool work or for jewelry trade, of the type in which the work is held in a dop mounting and means are provided for adjusting the dop and giving it an operational arcuate displacement in a plane normal or at a suitable angle to the cutting plane of a rotating disc or skaife (hereinafter referred to as a cutting disc). The invention may also be applied to what is known as "bruting" by the provision of a suitable form of cutting disc.

An object of the present invention is to provide an automatic or semi-automatic machine capable of cutting diamonds, or other stones, minerals or hard tool metals, to generate conical, pyramidal or faceted shapes, or to provide curves, radiussed points or clearance angles or to form spherical or domed faces or to generate a variety of other shapes or forms within the limits afforded by the operative displacements and adjustments provided by the invention.

Automatic operation is more particularly serviceable for mass production where a machine is set up for repetition work. For the normal routine work where a diversity of forms or shapes are to be generated more individual attention may be necessary and the invention includes a machine capable of hand operation, that is to say where an operative displacement (such as arcuate displacement or operation) is performed by the operative and not derived from a motor power source, while in the preferred arrangement automatic operation and hand operation are both available so that whichever is the more suitable to a particular disc may be employed.

The structure of a diamond is such that it is capable of being cut only when the abrasive grains pass in a certain directional sense relative to the grain or crystalline structure. This directional sense is known as the "polishing" or "cutting grain" of the diamond. Accordingly it is necessary in order to obtain automatic cutting action upon a diamond to provide a relative cyclic displacement between the cutting disc and the diamond to be cut along a path parallel with the cutting plane and comprising components of motion in two planes at right-angles to one another such that the cutting grain of the diamond is automatically found at least twice in each cycle. Although other displacements comprising the desired components may be employed it is preferred to utilise a planetary or orbital motion which has been previously proposed for the automatic grainfinding cutting of diamonds wherein the cutting disc in addition to being rotated about its own axis revolves in an orbital or planetary path.

It will be appreciated that in applying the invention to the bruting of diamonds or other stones and to the cutting of minerals or hard metal tools where there is no problem concerned with the cutting grain as with the diamond, that it is not necessary to employ a grain-finding orbital displacement and the invention, when applied to work other than diamonds, may be carried out in conjunction with any of the usual arrangements of cutting disc, although all material can be cut upon a machine employing a cutting disc with the planetary or orbital movement and it will be appreciated that such a machine has universal application.

Concerning the various shapes or forms to be generated it is an object of the invention to provide a machine or mechanism in or by which the diamond or other stone or mineral or hard tool metal (hereinafter referred to for convenience broadly by the term "stone") may be given controlled operational automatic or mechanical displacement to generate certain arcuate shapes or convex contours which cannot be produced by displacement in a path which is the true arc of a circle. For example certain tools require radiussing and where these tools are undercut or have a clearance angle it has been customary to effect the cutting by oscillation in a circular arc with the result that the radiussed contour or edge owing to the clearance angle cant of the stone is elliptical or approximates to an ellipse. For certain work, tools having a true circular edge or face are required and the invention enables such to be provided.

The means provided by the invention which enable this result to be achieved also enable a variety of exact forms to be generated in a mechanically controlled manner hitherto unattainable.

The invention consists in a machine for cutting, grinding, lapping or polishing diamonds or other stones for industrial tool work or for the jewellery trade, comprising: a machine stand; a rotary cutting disc mounted on the machine stand; a radial arm having at one end a pivotal spindle mounting on said stand with the pivotal axis arranged to afford said radial arm oscillatory arcuate movement in a plane normal to the cutting plane; a longitudinal slideway on said radial arm; a slider on said slideway; dop mounting means on said slider for holding the stone to be cut, the arrangement being such that the dop is capable of oscillation in an arcuate path about the pivotal axis of the radial arm with the stone in contact with the cutting disc; and modifying means for the arcuate path of the dop mounting means consisting of a former supported on the radial arm adjacent the pivotal axis thereof and connected to said slider; and an abutment member mounted on the machine stand adjacent to and for engagement by the former, the arrangement being such that oscillation of the radial arm rotates the former about the said pivotal axis and against the abutment member whereby the slider is displaced along said slideway of the radial arm to modify the arcuate path of the dop mounting means during said oscillation and afford cutting contact loci for the stone at the cutting disc as determined by said modifying means.

By "former" as used herein and in the claims, is meant a rotary cam or body operating as a cam which when rolled upon a relatively fixed abutment causes the displacement of the part to which the former is attached, in accordance with the shape of the former at the plane of contact with the abutment. A cylinder, the axis of which is inclinable to the axis of the pivot of the radial arm by rotation about an axis normal to the cylinder axis so that it presents an elliptical contact track to the abutment, constitutes an example of a body operating as a cam, the different angles of inclination available affording a large variety of elliptical camlike forms.

By "abutment member" as used herein and in the claims is meant a linear edge or elongated surface such as a rectilinear or curved edge of a plate, mounted adjacent the former in a plane at right-angles to the pivotal axis of the radial arm.

The inclinable cylindrical former may be employed, among other things, for radiussing a tool having an undercut or clearance angle so as to produce a radiussed portion possessing a true circular arc.

Further features of the invention will be hereinafter described and defined in the claims.

The accompanying drawings illustrate a mode of carrying the invention into effect, by way of example, for cutting stones including diamonds, that is to say a machine wherein means for giving a dop operational displacements and adjustments appropriate for the generation of the desired form are exemplified in conjunction with mechanism for giving the cutting disc a planetary movement in relation to the dop such that when treating a diamond the cutting grain thereof is automatically found.

It will be appreciated that when a machine is required solely for cutting stones other than diamonds it is not necessary, although it may be advantageous, to employ a cutting disc having an automatic grain finding planetary motion and it will be observed that a machine embodying such planetary cutting disc or other means for automatically finding the cutting grain may be constructed as a standard machine for all classes of work.

In the accompanying drawings—

Figure 1 is a side elevation (partly in section) of a machine according to one form of the invention, illustrating the combination thereof with a rotary planetary cutting disc.

Figure 2 is a front elevation of the machine showing the driving means in a section taken on the line 3—3 of Figure 8.

Figure 3 is a front elevation of the lower part of the stand of the machine illustrating motor driving means.

Figure 4 is a plan view of the machine seen in Figures 1 and 2.

Figure 5 is a plan view showing a suitable mode of mounting the rotary planetary cutting disc shown in Figures 1, 2 and 4.

Figure 6 is a side sectional elevation showing in detail the mounting for the rotary planetary cutting disc illustrated in Figure 5.

Figure 7 is a rear elevation of the cutting disc mounting according to the plan shown in Figure 5.

Figure 8 is a sectional plan of a suitable arrangement of driving connections for oscillating the dop mounting means in an arcuate path and for reciprocating the mounting for the planetary cutting disc.

Figures 9 and 10 are respectively a side elevation and plan view of one form of dop holder or mounting detachably securable to a feed slider carried by means mounted upon a radial oscillable arm as seen in Figures 1 and 4.

Figures 11 and 12 are respectively a side elevation and plan view of another dop holder or mount and Figure 13 is a detail section of a pivot device for a dop bed member or arm.

Figure 14:
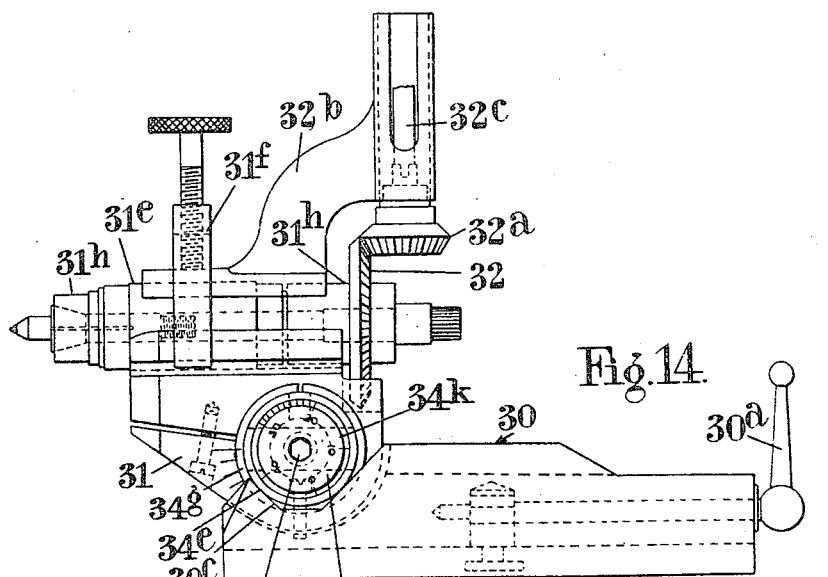
Figures 14, 15 and 16 are respectively a side elevation, a plan and a front end elevation of a third form of dop holder or mount where a continuously rotatable dop is employed.

In carrying the invention into effect according to one mode adapted to provide a standard machine capable of cutting all stones including diamonds, a stand 1 has at one side indicated at 2 (see Figures 1 and 4) of the platform or top of the stand a planetary cutting disc mounting and on the other side 3 mounting means for the dop and for giving it the required operational displacements and adjustments.

Describing first the cutting disc mounting arrangement, the cutting disc 4 the cutting plane of which is located vertically is mounted in a crank disc 5 and is rotatable about its own axis A—A. The disc 5 is secured to a hollow tapered mandrel or body 6 which is mounted in a bearing in a housing block 7 so that the mandrel and crank disc are capable of being rotated in the housing about the planetary axis B—B. In rear the tapered mandrel 6 has a cylindrical portion 6a at the end of which there is a screwthread for receiving a securing nut 6b which bears against thrust plates 6c. A worm wheel 6d is fixed on the cylindrical portion and adapted to be engaged by a driving worm 8 mounted in bearings in the housing above the worm wheel for rotating the mandrel 6 and giving the cutting disc its planetary motion about the crank disc and mandrel axis B—B.

The crank disc is provided with a radial slot 5a (in Figure 7) in which a crank pin 9 carrying the cutting disc is mounted so that the crank throw or radial distance between the axes A—A and B—B is capable of adjustment. The shank of the crank pin device has a bore within which a hollow spindle 9a is located and on the end of which the cutting disc is detachably mounted.

The crank pin device 9 has a clamping flange 9b in which a rebate is formed for receiving a sheave 9c held in place by a plate 9d. The sheave is connected by a rod 10 to cutting disc drive mounting means (described later) so that the drive connection may follow the planetary orbit of the cutting disc whilst continuously communicating rotation to the disc. This plate is secured by a pair of bolts 9e which pass through the clamping flange 9b and through parallel slots 9f in the crank disc 5 and also serve for locking the crank pin device in any required throw adjustment position. Thus the crank pin device 9 is held in position radially of the disc 5 by friction created by the clamping action taking place between the flange 9b and the crank disc 5. The spindle 9a has a tapered enlargement 9g (see Figure 6) at its forward end which serves as the inner race of a ball bearing 9h the outer race of which is recessed in the end of an extension 9i of the clamping flange 9b. Secured on the rear of the spindle 9a is a split member 9j for holding the spindle in the operative position within the crank pin bore. The forward part of the member 9j forms the inner race of a ball bearing 9k located in a recess in the end of the shank of the crank pin device 9.

The cutter disc is carried on a driving pulley member 4a (for rotating the disc about its axis A—A) which is frictionally secured on a forward bevelled portion of the enlargement 9g of the spindle 9a. The rear of the member 4a is recessed and is housed over the extension 9i. At the front the member 4a has a collar 4b on which the disc 4 is removably secured by a dished plate 4c and set screw 4d engaged in the hollow spindle 9a.

Interchangeable cutting discs are provided so that the disc most appropriate to the treatment—bruting, grinding, lapping or polishing and the like—may be fitted to the collar 4b and secured by the screw 4d. For bruting, a disc studded with diamond points is provided and as when bruting the disc must be run at a very much slower speed, reduction gear means is introduced to afford an appropriate speed of rotation for the bruting disc.

The diameter of the cutting disc 4 (which strictly speaking is a broad annulus as it has a central aperture for accommodating the dished plate 4c) should be at least equal to half that of maximum throw of the crank pin device so that the diamond may be continuously traversed upon the disc face without interruption.

The rod 10 attached to the sheave 9c (see Figures 2 and 4) extends in a more or less horizontal direction to a post 10a where it is adjustably secured in a bracket 10b on a block 10c vertically adjustable in a slot in the end of the post. The vertical post towards its lower end is pivotally mounted on a shaft 10d in a frame 10e (see Figure 3) and is provided with a counterweight 10f. Coaxial with the pivot two driving pulleys 10g of different diameters are mounted. A pair of pulleys 10h are mounted on the bracket 10b adjacent the angle the horizontal rod 10 makes with the post 10a. A cord or round driving belt 10i is passed over the pulley 4a at the back of the cutting disc, around one of the pulleys 10h and the selected pulley 10g and back over the second of the two pulleys 10h. Pulleys 10j mounted for communicating a drive to the two pulleys 10g receives the drive by belts 10k from an electric motor 11 fixed in the lower part of the stand or base 1. The stand or base 1 also serves as a convenient mounting for electric motors 12 and 13 which respectively provide the power for the drive for oscillating the dop mounting means and rotating the mandrel 6 and for reciprocating the rotary cutting disc mounting as will be described hereinafter. It will be appreciated that by the above arrangement the drive mounting post 10a can swing about the pivot 10d under the control of the balancing action of the counterweight 10f so that the driving means accommodates itself to the orbital movement of the cutting disc 4 about the planetary axis B—B.

The housing 7 for the mandrel of the crank disc is mounted on a slideway (see Figure 2) in a cross bed 14 so that the housing, mandrel and cutting disc can be adjusted axially. A hand operable adjustment screw 7a is provided to position the housing in its slideway. The screw 7a engages a nut member 7b screwed to the underside of the housing and a flange 7c on the screw engages one side of a bridge 7d provided on the cross slide bed 14 and through which the screw freely passes. After adjustment the screw 7a may be locked by nuts 7e. For measuring the amount of axial adjustment of the housing 7 a bracket 7f attached thereto carries a dial micrometer (see Figure 4) the spindle 7g of which abuts against the rear face of the cross bed 14.

The bed 14 is itself adjustably mounted on a slideway disposed at right-angles to the planetary axis B—B and formed by a groove in the top of the stand 1 in which runs a V-shaped rail 14a. Mechanical means (referred to hereinafter) are provided for giving the bed 14 a continuous reciprocating movement along the slideway so that the planetary axis B—B and consequently the cutting disc 4 moving in its orbit is continuously reciprocated to and fro in a horizontal direction at right-angles to the said axis. Means may also be provided for reciprocating the housing by hand when desired. For this purpose the bed 14 carries on posts 14b, a rack 14c (see Figures 2 and 8) with which meshes a pinion 14d on a shaft 14e mounted in bearings in the stand 1. The shaft 14e is operated by a handle 14f. The rack member 14c may be conveniently extended as at 14g to serve as an attachment for the mechanical reciprocating means to be described below.

In order that the bed 14 may be adjusted with respect to its slideway (primarily in setting up the machine, to align the planetary gear so that the cutting plane of the disc 4 lies in the correct vertical plane with respect to the dop mounting means) the bed is pivotally attached by a set screw 14h located in the vertical plane of the planetary axis. The bed 14 is fixed (when adjusted) to the rail 14a toward each end thereof by screws 14i located in transverse slots 14j which permit a limited adjustment about the pivot screw 14h. For imparting the angular adjustment movement to the bed 14 a pin 14k is engaged in a slot in a sliding bar 14l which is reciprocated by a milled nut 14m engaged on a screw secured in the rear of the bed 14.

Upon the stand 1 and below the axis B an abutment in the form of a horizontal knife edge member 15 is mounted on a bed or block 15a which is accommodated in an aperture formed in the cross bed 14 (see Figure 1). The block 15a has a slideway parallel with the planetary axis B—B. A slider 15b on which the edge 15 is mounted, is longitudinally adjustable in the slideway by means of a screw threaded rod 15c so that the vertical plane of the knife edge may be accurately positioned with respect to a former on the dop mounting means with which it cooperates. The position of the abutment edge mounting shown in the drawings and described above is fixed (apart from its longitudinal adjustment in the block) but in order to distribute the wearing contact thereon of the cooperative former the slider 15b may be mounted for reciprocation transversely to the axis B—B, which may be conveniently effected by locating it in a slideway mounted on the reciprocating bed 14 so that the abutment edge 15 is constantly displaced to and fro together with the planetary gear in the vertical plane of the edge 15.

In the case under consideration the abutment edge 15 is a straight edge but for producing certain forms as may be determined by calculation, it may be curved, or of concave or convex shape or it may have a concavo-convex, angular or other form.

While any suitable means may be provided for mechanically reciprocating the cross bed 14 with its planetary housing 7, it is preferred to employ a drive associated with driving means for oscillating the dop mounting means about a vertical axis, as will be referred to hereinafter.

The rotation of the mandrel 7 of the crank disc 4 through the worm drive 6d and 8 is effected by any convenient means but it is preferred to employ a separate electric motor and means for varying the gear ratio for the drive may be provided, for example the shaft of worm 8 may have two or more driving pulleys 8a (see Figures 2 and 3) of different diameters for receiving a belt 8b driven by the motor 13 on the lower part of the stand 1.

Turning now to the description of dop mounting means and the operational displacement mechanism therefor, the right-hand side 3 (see Figure 1) of the top of the stand 1 serves as a platform upon which the dop mounting appurtenances are positioned. In order to provide for an oscillatory movement for the stone in the arc of a circle about the axis C—C which lies in the vertical cutting plane of the disc 4 when the machine has been adjusted for operation, the stand 1 is bored and machined with a tapered bearing cavity (coaxial with the axis C—C) for a corresponding tapered vertical pivot spindle 16 which is preferably hollow or has an axial bore for optical purposes (described hereinafter) and has a radial arm 16a secured to it which is adapted to be oscillated about the axis C—C. The outer end of the radial arm 16a lies adjacent a semicircular flange or rail 17 which is calibrated throughout the arc which preferably embraces 180°, for reading against an index which may be in the form of a vernier scale 16c carried on the outer end of the arm. The zero position is preferably located in the middle of the calibrated arc and when the machine is set up the vertical plane of the axis B—B is aligned with the zero mark. Adjustable stops 17a, 17b are provided for limiting the throw of the radial arm. The stops may be conveniently slidable in a groove 18 in the top of the stand 1 within which they may be locked by a T device manipulated by the handle shown in Figure 4. For convenience in hand adjustment or operation by hand oscillation the radial arm 16a has attached to it a suitable handle or manipulating hold 16b secured to the end of the arm.

In order to fix the radial arm 16a in any angular position in the arc of movement for the purpose of adjusting the dop so that its axis lies at any angle with respect to the cutting plane for generating certain forms, for example conical surface or pyramidal facets, the two stops 17a, 17b are brought into contact with the opposite sides of the radial arm and locked in their positions in the groove so that movement of the arm in either direction is prevented by said stops. Any other means may, if desired, be employed to fix the radial arm in any angular position, for example the handle 16b may have a depending lug (not shown in the drawings) located on the outer side of the rail 17 and having therein a set screw which may be engaged with the side of the rail 17 to lock the radial arm.

The automatic or mechanical oscillation of the radial arm may be effected by any suitable means, provision being made for adjusting the length of the arc of movement up to a full semicircle. Similarly any suitable means may be provided for reciprocating the planetary mechanism as a whole.

According to one suitable means for effecting the mechanical oscillation of the radial dop carrying arm 16a and also for reciprocating the cutting disc planetary mounting, the tapered pivot spindle 16 of the radial arm is driven through a sleeve 18 on which worm teeth 18a are cut. The inner surface of the sleeve is rotatably located upon the exterior of a boss 1a depending from the stand platform and acting as a bearing for the sleeve in its oscillatory motion. The sleeve is vertically positioned by a plate 18b attached to the end of the bearing boss 1a. Oscillations imparted to the worm gear 18a and sleeve 18 are communicated to the spindle 16 through a friction clutch or slip friction means in order that when the stroke of oscillation for the radial arm 16a is adjusted slightly to overrun the stops 17a, 17b, as is preferred, the slip friction means accommodates the excess displacement. To this end the lower extremity of the sleeve 18 has attached to it a clutch plate 18c carrying friction surface material. The other clutch plate 18d is slidably mounted on the end of the spindle 16 and imparts the drive to the spindle through a dog coupling 18e which allows for slight axial movement of the plate 18d under the influence of a spring 18f. This spring maintains the clutch plate members in engagement and its tension may be adjusted by a milled nut 18g engaged on the screwthreaded end of the spindle 16. By slacking this nut the spring pressure may be made too weak to enable the friction clutch plates to function and this method of disconnecting the drive may be adopted when it is desired to oscillate the radial arm by manipulation of the handle 16b.

The sleeve 18 is surrounded by a housing 19 in which a bearing is provided for the worm device 20. The worm and the worm wheel 18a serve primarily in the capacity of a rack and pinion drive. The worm 20 is formed on an internally screwthreaded sleeve 20a which has an operating milled head 20b and meshed with the threaded extension 20c of a connecting rod 20d. The milled head 20b is locked by a nut 20e operating through a spring washer. By turning the milled head 20b the sleeve 20a and worm 20 can be advanced or retracted axially upon the rod 20d to alter the setting of crank driving means with respect to the position of the radial arm.

Reciprocation is communicated to the rod 20d by the crank drive means which may conveniently be accommodated in a casing 21 attached to the side of the stand 1. In the casing walls bearings 21a are provided for a drive shaft 21b which has at its outer end a pulley 21c connected by a belt 21d to the motor 12 (Figure 3). The shaft has a driving worm 21e. Mounted on stub shafts 22, 23 secured in the bottom of the casing are a pair of worm wheels 22a, 23a which both mesh with the worm 21e.

Above the worm wheel 22a a variable throw crank disc device 22b is secured for driving the spindle 16 of radial arm 16a. A crank pin 22c to which the end of the rod 20d is coupled is fixed in a crank slider 22d which is located in a slideway in the member 22b. Two diametrically arranged slots 22e, 22f are provided in a cover plate 22g secured to the crank device 22b. The crank pin 22c and a small pin 22h reside in the slots 22e and 22f respectively and serve as auxiliary guiding means for the displacements of the slider 22d. The disposition of the slider and its crank pin 22c is radially adjusted by a screwthreaded rod extension 22i engaged by a milled nut 22j axially positioned between the plate 22g and member 22b for varying the throw of the crank pin 22c and through the rod 20d the amplitude of oscillation of the radial arm 16a. The crank pin 22c may be in the form of a set screw 22k and have a collar 22l on which the end of the rod 20d is mounted. By means of the set screw crank pin 22c the slider 22d when adjusted by the milled head 22j may conveniently be locked in any position.

The worm wheel 23a also has a crank disc device 23b which in this case is for imparting reciprocation to the slider bed 14 of the planetary mounting. A crank pin 23c is fixed in a slider 23d displaceable in a slideway in the crank disc 23b. The crank pin extends through a slot in a cover plate 23e and has a collar on which is coupled a link 24. The crank pin may be in the form of a set screw and serve as a locking device for fixing the slider 23d in any adjusted position for varying the throw of the crank pin.

The link 24 is pivotally connected to a lever 24a the outer end of which is coupled to a connecting rod 24b attached by a removable pin 24c to the extended end of the member 14g carrying the rack 14c for communicating reciprocating motion of the desired amplitude to the slider 14 and hence to the cutting disc and its planetary mechanism. It will be appreciated that by this arrangement the stone track upon the cutting disc is constantly varied within the zone afforded by the selected reciprocating stroke. When it is desired to reciprocate the planetary mounting by rotating the shaft 14e by hand, the pin 24c is removed to disconnect the mechanical drive.

Instead of using crank driving means as above described the reciprocation of the planetary mounting and the oscillation of the radial arm and dop mounting means may be effected by a rotary cam device of known type.

The dop mounting means are carried on the radial arm so that such may partake of oscillations imparted to the arm and the dop and stone for treatment moved in an arcuate path subtended by any angle up to approximately 180°. Means are also provided which are capable of modifying said arcuate path by a controlled radial displacement of the dop mounting means upon the radial arm, so that the dop may be oscillated or adjusted in a true circular arc or may be given, as required, a modified or non-circular path.

According to one form the radial arm 16a has mounted upon it a carriage 25 displaceable radially of the arm in a geometric ball bearing slideway 25a. Springs 25b located between the outer end of the carriage and an abutment on the radial arm, constantly tend to urge the carriage and the superposed structure towards the axis C—C of the radial arm.

Upon the carriage 25 a control device in the form of a block 26 is detachably secured by means of a known eccentric locking device 26a operating in a groove in the top of the carriage 25. This control device embodies one part of the means for imparting the modifying movement referred to above. This part of said means comprises a roller or cylinder 27 adapted to cooperate with the other part of said means which is the abutment edge 15 above described (see Figure 1). The cylinder 27 is rotatably mounted upon a coaxial spindle 27a carried in a bracket 27b transversely slidable in the slideway 27c upon a head 27d. This head and its rearwardly extending horizontal supporting rod 27e are rotatably mounted in the control block 26 so that the axis of the cylinder 27 can be skewed or partially revolved about the head and rod axis D—D. A cam locking device operated by the lever 26b serves to secure the head and the cylinder in any angularly adjusted position. For determining the angle to which the cylinder may be skewed the head may be calibrated as at 27f and read with respect to a zero mark or pointer on the control block 26. The slider of the cylinder bracket 27b is transversely adjustable on its slideway 27c in the head by micrometer screw means 27g.

The periphery of the cylinder 27 is adapted to contact with the knife edge 15 and the spring means 25b act on the carriage 25 and control block 26 constantly to maintain the cylinder in contact with the knife edge.

In setting up the machine, the axis of the cylinder 27 is initially adjusted to be coaxial with that of the vertical pivot axis C—C of the radial arm and the axis D—D lying in the horizontal plane of the straight edge 15. When the cylinder axis is vertical coincident with the axis C—C no radial displacement is imparted to the carriage 25 while the radial arm 16a is being oscillated about its arc of movement but when the axis of the cylinder 27 is skewed or partially revolved about the axis of its rod 27e the horizontal plane of the abutment knife edge intersects the cylinder at an angle to its axis and the rolling contact loci lie on an elliptical line, thus the cooperative effect of the former and the abutment is to cause the carriage 25 to be displaced radially to and fro as the radial arm is oscillated in its arcuate travel from side to side of the vertical or zero plane of the pivotal axis C—C of the radial arm In setting the cylindrical former to cut a predetermined radiused clearance angle on a stone the angle to which the axis of the cylinder is skewed with respect to the vertical is calculated as hereinafter described to afford the correct modifying radial movement of the dop mounting means so that any section taken parallel with the table or top of the stone possesses a radius curve which is a true semi-circular arc or any desired fraction thereof. The adjustability of the angle of the axis of the cylinder provides a variety of generating elliptical forms, the longitudinal axis of which progressively increases in proportion to the increase in the angle of cant of the cylinders.

The upper side of the control block 26 is also provided with a geometric ball bearing slideway 26d and is adapted to receive a tool feed slider 28 on which one or other of various interchangeable dop holding and mounting devices may be attached. At the rear of the control block, a plate 26e is provided to act as a stop plate for a feed screw and micrometer measuring device to be referred to below.

The tool slider 28 is resiliently urged by spring means towards the cutting disc, for example a lug may project from each side of the tool slider to each of which a tension spring 29 is connected, the other end of which is anchored to a pin on the side of the control block 26 or is adjustably anchored in one or other of a series of apertures in a plate (not illustrated) attached to the side of the control block or to another member, such as the carriage 25, if a control block 26 is not in use.

The forward feeding movement exercised by the springs 29 upon the feed slider 28 is controlled by a fine or micrometer screw device 28a mounted in a depending bracket 28b depending from the tool slide, the end of the fine adjustment screw being adapted to bear upon the stop plate 26e carried by the control block (or other equivalent member which may occupy the position of the control block according to the nature of the operation being performed). In order to provide for a fine reading the bracket may carry a dial face micrometer device 28c the plunger of which is adapted to bear against the plate 26e so that as the feed slide is let in to feed the stone inward against the cutting disc by manipulation of the screw 28a, the plunger of the micrometer device is set back a corresponding amount and the degree of the adjustment can be accurately read on the clock face of the micrometer.

For convenience in quickly positioning and releasing a dop holder or mount (such as described below) the sides of the bed of the feed slider 28 may be bevelled to coact with correspondingly bevelled flanges on the mount. A central groove 28d of T shape in cross-section may be formed in the bed of the feed slide 28 for receiving the head of a locking member carried by the dop holding mount.

A variety of interchangeable dop holding mounts (indicated by the general reference 30—see Figures 9, 11, 14) may be provided each with accessory adjustment means adapted for the particular operation it is intended to perform upon the stone. The locking member for the mount, which may be of known form (such as that referred to in connection with the locking of the control block 26) may be locked by a turn of the handle 30a in any longitudinal position in the T-shaped groove 28d. The groove 28d also serves to accommodate a stop 28e which is fixed in position so that the dop holding mount may not inadvertently be pushed inwards so far as to damage a stone by thrusting it against the cutting disc.

According to one form of dop mount (see Figures 9, 12 and 1) a cranked arm 31 is provided for receiving a dop proper 31a in which the stone is secured. The arm is pivoted at 31b on a horizontal axis at right-angles to the radial arm so that the stone may be tilted to vary the vertical angle (which may be read on a scale such as illustrated) the table of the stone makes with the cutting disc, as for example for grinding a tool clearance angle (or similar kind of angle) upon the stone. For tilting the arm 31 it is provided with a lug 31c projecting rearwardly between the pivot bearings of the head 32. A pair of set screws 32a bear upon the lug 31c and by the manipulation thereof the arm 31 may be moved about the horizontal pivot 31b. The head is mounted on a horizontal pivot bolt 32b located in the vertical plane of the radial arm (or parallel thereto) and carried on the cross slide 33, so that the head 32 and arm 31 may be canted about the axis of the pivot bolt 32b. This canting movement may be effected by a pair of set screws 33a which engage an offset lug 32c projecting rearwardly from the head. The cross slide is moved on a slideway 34 of a vertical slider 34a by a screw key 34b. The vertical slider is adjusted on its slideway 30b by the screw 34c. The dop 31a for receiving the stone may have a screw, finger or other clamping device for holding the stone in position (or for clamping a stone holding quill in position with or without an adapter according to the design of the dop).

The cranked arm 31 is also adapted to receive interchangeable dops in place of the dop 31a illustrated but for certain work such as the cutting of pyramidal facets or generating conical forms it is preferred to provide independent interchangeable holders or mounts, for example as illustrated in Figures 11 and 14.

Referring to Figures 11, 12 and 13, a holder 30 similar to that described with reference to Figure 9 is detachably mounted on the feed slide 28. The vertical slider 34a in this case, however, has a pair of brackets 34d having arcuate beds for the reception of a barrel member 34e secured to the beds by screws 34f. The barrel (see Figure 13) is surrounded by an axially displaceable sleeve 34g which has secured to it a nut member 34h slidable in slots 34i in the barrel. An adjustment screw 34j is engaged in the nut and the screw is turned by a cap 34k which is provided with operating key cavities 34l. The other end of the screw 34j is engaged by a screw carried in a similar cap which serves to lock the screw 34j after adjustment. The cap 34k may be calibrated with a scale readable against an index mark on the end of the barrel or on the bracket 34d so that the axial position of the sleeve 34g and the dop holding arm 31 clamped by a split collar 31d thereon, may be measured. The dop arm 31 may also have a scale readable against an index mark on the sleeve for aiding in determining the angular position in which the arm 31 is clamped with respect to the sleeve 34g. The arm 31 has a dop bed of appropriate shape for receiving a square or polygonal dop or quill 31e secured in position by a clamp 31f.

The bed is intended to receive a variety of interchangeable dops or quills of polygonal form, the number of sides being chosen to correspond with the number of pyramidal facets to be cut on the stone such as that seen mountned in the end of the dop 31e. For this purpose each dop may be provided with an adaptor (not shown) having a seating corresponding to the shape of the dop and external sides adapted to fit the bed on the arm 31. At the rear of the arm bed a stop pin 31g may be provided for convenience in locating the dop axially in the bed.

Figure 15:
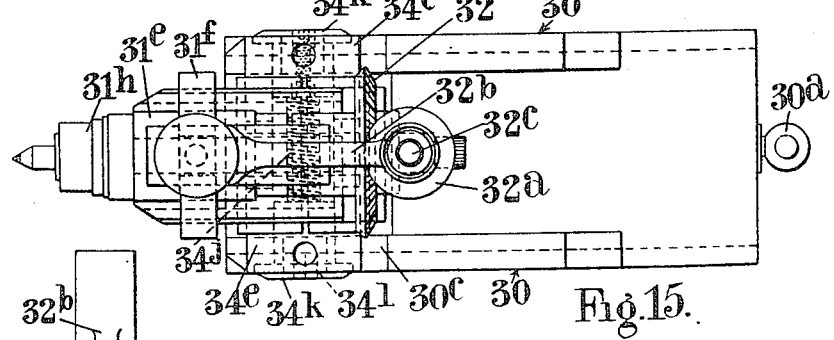
Figure 16:
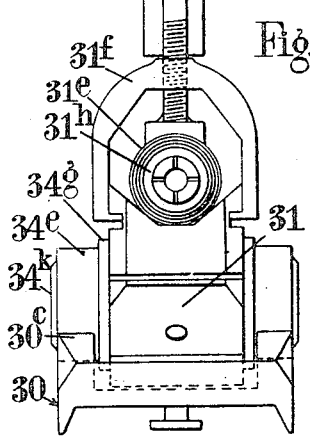

According to another form of tool holding means for a rotatable dop for generating conical forms or for cutting pyramidal facets by aid of an indexing or dividing head, the mount 30 (see Figures 14, 15 and 16) is provided with a pair of beds 30c on which the barrel 34e (similar to that described with reference to Figure 13) is secured. A dop mounting block 31 is clamped to the sleeve 34i of the barrel in adjustable angular positions in similar manner to that described with reference to the arm 31 (Figure 11) and is provided with a corresponding dop bed for receiving a dop rotary holder 31e which is of known form, comprising a cylindrical body portion within which a dop member 31h is rotatably mounted. At the forward end of the member the stone is held in a manner appropriate to the nature of the treatment to be carried out and at the rear the member 31h is provided with a bevel gear 32 adapted to mesh with another bevel gear 32a mounted in a vertical bearing in a bracket 32b secured upon the holder 31e by a screw clamp 31f which also serves to secure the holder 31e on the bed of the block 31. The bevel wheel 32a has a coupling spindle 32c for receiving the end of a flexible driving shaft the outer envelope or tube of which is mounted in a vertical bearing upon the bracket so that a drive may be communicated through the coupling to the bevel gears from any suitable source such, for example, as a small electric motor.

The above bevel gear and flexible shaft arrangement is adapted to afford a drive so that the stone can be continuously rotated about the horizontal axis of the holder 31e as, for example, for cutting conical points or tools or for radiusing conical points.

In lieu of the continuous drive or in addition thereto the holder 31h may be provided with a dividing head or indexing device in the form of a ratchet toothed disc 32d (see Figure 17) engageable by a spring pressed pawl 32e mounted on bracket 32b and operated by manipulating pieces 32f so that the holder and stone may be progressively turned stepwise and locked in a succession of angular positions for cutting pyramidal facets or cutting the stone in different positions throughout the arc of a circle. The bracket 32b (Figure 17) is secured on the holder 31h and the latter fixed to the bed of the block 31 (Figure 14) in place of the holder with the bevel wheel drive seen in that figure.

It will be appreciated that although three forms of interchangeable holders or mounts 30 have, as seen in Figures 9, 11 and 14, been described above the invention is not limited in this respect but any dop mount may be provided which is calculated to afford the required adjustments and/or operational displacements for the required cutting operation.

In order to enable the progress of the work upon the stones to be observed without removing the dop and while the stone is still in contact with the cutting disc, an optical viewing device may be provided. In one suitable form (reverting to Figures 1 and 2) the pivot spindle 16 of the radial arm 16a and the spindle 27a of the cylindrical former 27 are provided with coaxial bores. Below the radial arm mounting in the stand 1, a right-angled prism or mirror device 33 deflects a parallel light beam produced by the projection tube 33a vertically through the bore of the pivot spindle 16 and bore of the spindle 27a so that the beam traverses the cutting position of the stone upon the disc 4 under treatment. The diameter of the bore of the spindle 27a is sufficiently large to allow the light beam to pass through the bore even when the former 27 is skewed to the maximum angle required for any particular operation. Above the planetary gear and over the stone cutting position a viewing device 33b (see Figure 1) comprising a lens combination is mounted in conjunction with a prism eye-piece so that the diamond under treatment can be inspected.

The device 33b is pivotally mounted on the bracket 33c of a slider 33d mounted upon a slideway member 33e secured upon the housing 7 of the planetary gear. Angular adjustment of the device 33b and the displacement of the slider 33d are effected respectively by operation of the milled screw 33f and 33g, the latter of which has a pinion engaging a rack upon the member 33e.

In association with the light path a graticule may be provided or a transparent screen may be interposed on which is engraved the master shapes or contours of the form or forms to which the stone is to be cut. The eye-piece combination being pivotally mounted in brackets may be turned about the horizontal pivotal axis so that the combination may be moved out of the way if desired. Although the optical device is arranged in the drawings so that progress can be viewed by an operator standing at the front of the machine it may, if desired, be mounted so that viewing may take place from the side. According to an alternative arrangement, instead of providing for vision through an eye-piece, optical means may be employed for projecting an image of the stone shape upon a screen either alone or in association with graticules or outlines or contours representing the master shape or shapes for the diamond. For affording a direct vision device for viewing the cutting progress which may also be used while the machine is in operation, a screen 33h (Figures 1 and 2) illuminated by a lamp in a tube 33i may be mounted on a curved bracket 33j. The screen is located in a plane parallel with the vertical plane containing the planetary axis and laterally of the cutting contact position so that the stone viewed from the side against the illuminated field of the screen is silhouetted. The bracket 33j is mounted on the housing 7 and may be conveniently pivoted as at 33k on a horizontal axis to enable it to be swung out of position when desired.

For the initial setting up of the apparatus and before the cylindrical former 27 is in position, a chisel-edged gauge 34 may be employed for vertically aligning the cutting plane of the disc 4 with the axis C. The gauge is placed vertically flat against the face of the disc and is used in conjunction with a removable tablet 35 having a tapered stem fitting into and accurately positioned in the bore of the spindle 16 (see Figure 1). The tablet 35 is provided with a pair of spaced engraved lines between which the chisel edge of the gauge is located and the cutting face of the disc 4 is brought into flat contact with the shank of the gauge 34.

In the use of the machine for generating conical forms the radial arm 16a is adjusted and locked to locate the axis of a dop such as shown in Figure 14 so that it makes an angle with the cutting plane of the disc 4 equal to half the apex angle of the cone to be generated. The dop is revolved about its axis by the gears 32, 32a by the flexible drive 32c and the feed slide 28 is let in to afford the desired degree of cutting contact with the disc. The cutting operation then proceeds under the planetary and rotary motion of the disc, the feed being adjusted from time to time as required until the final form is generated and it will be appreciated that the cutting operation will proceed automatically even when a diamond is under treatment owing to the automatic cutting grain finding property afforded by the planetary motion of the cutting disc.

When it is required to radius the apex of a conical form after it has been generated as above described for example, the radial arm 16a is oscillated by hand or by the automatic drive means through an appropriate angle, the amplitude of the oscillation being preferably determined by the setting of the stops 17a, 17b. The proper axial position of the stone with respect to the cutting plane is set and during oscillation the feed slide is adjusted in the manner required as will be understood.

In a similar manner domed forms of semispherical shape (or other fraction of a sphere) may be generated by concurrently rotating the stone about its axis (disposed horizontally) and oscillating the dop mounting means in the appropriate arc.

Figure 17:
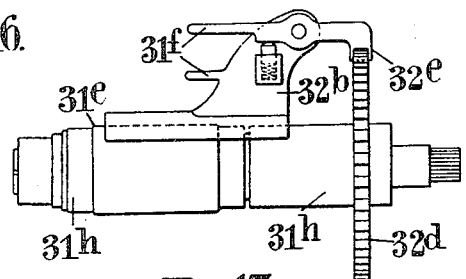
Figure 17 is a detail side elevation of a dop arranged for step by step rotation, and includes a dividing plate or head for use in cutting facets.

For generating facets such as for a pyramid or such as if produced would form a pyramid, the arrangement shown in Figure 17 may be employed and the dividing head see Figure 17 operated to afford the stepwise setting to give the displacements required for the number of facets.

In certain cases where the number of facets is not too great a dop having polygonal sides corresponding in number with the number of facets, of the kind shown in Figures 11 and 12 may be employed instead of the dividing head gear illustrated in Figure 17.

For radiussing a tool having a clearance angle then the table of the stone is canted in the cutting position, the cylinder is skewed in the manner already described and the radial arm oscillated by hand or automatically in the required arc.

The initial setting of the tool with respect to the cutting plane is adjusted as required and the inward feed adjusted as already indicated from time to time. Owing to the control effected by the canted or skewed cylindrical former 27 the point of the stone will be automatically retracted and advanced the required fraction of an inch necessary to modify the cutting contact loci to generate a radius which is the true arc of a circle upon the clearance angle surface instead of an elliptical one as hitherto when the oscillation of the stone has taken place on a circular arc.

It will be apparent that the control means adapted to produce the modified arcuate path of oscillation may be utilised to generate a variety of domed or convex forms by setting the axis of a cylindrical former to the required angle of skew or cant or by substituting a specially shaped former and/or abutment edge or member calculated to control the generation of the desired shape upon the stone by the oscillatory operational displacement in conjunction with the appropriate adjustment setting or adjustment setting and the appropriate concurrent operational displacement of the dop mounting means such, for example, as rotation of the dop about its axis.

For setting up when it is desired to cut circular arcs or cylindrical surfaces upon tools having a clearance angle, it is necessary to appreciate the theoretical basis of the modifying apparatus so that the former 27 (Figure 1) may be adjusted according to the formulae hereinafter stated. It will be seen referring to Figure 1 and Figures 18-20, that the function of the apparatus may be considered as an ellipse WYXZ (Figure 18), which is rotated about a point O so that it is always in contact with the line EE, and so that its minor axis YZ will always pass through the point O.

The ellipse WYXZ is formed by a horizontal plane through the cylindrical former 27 (Figure 1), where the line of the apex or ridge of the straightedge 15 lies in that plane, and the roller is set at an angle from the zero position in which the axis of oscillation of the radial arm and the axis of the form are in alignment.

The line EE may be considered as the line of apex of the straight edge 15.

The point O may be considered as the axis C—C Figure 1.

The perpendicular distance OR to EE will be the radius of the former 27.

The line FF parallel to EE may be considered as a horizontal line on the face of the cutting disc 4.

The perpendicular distance OS to FF will be the perpendicular distance of the cutting face of the cutting disc 4 from the axis C—C Figure 1 which may be called $h$.

The minor axis YZ of the ellipse WYXZ may be considered as the axis D—D Figure 1.

Now: if the former 27 set at an angle $\phi$ from zero, (Figure 19) has a radius R, then—

Figure 20:
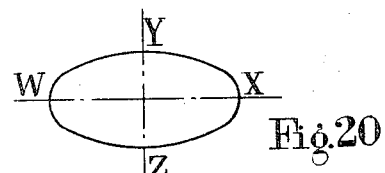

The major axis $WX$ (of the ellipse $WYXZ$ in Figure 20) $= \dfrac{2R}{\cos \phi}$ and the minor axis $YZ = 2R$ (of the ellipse WYXZ in Figure 20)

Figure 18:
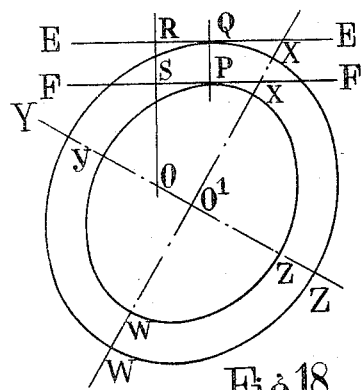
Figures 18 to 24 are diagrams referred to hereinafter in explanation of the theory and setting up of the apparatus utilising the means provided for modifying the arcuate oscillatory path of a stone.

Since the line EE Figure 18 is tangent to the ellipse WYXZ, and the line FF is parallel to EE, then FF will be tangent to an ellipse $wyxz$, whose axes lie in the axes of WYXZ, where $$wx = WX - 2QP \text{ and } yz = YZ - 2QP.$$

QP being the perpendicular distance from EE to FF.

Therefore: if $QP = (\text{constant}) K$ and $RO = YO$ then $$wx = \frac{2R}{\cos \phi} - 2K$$

$$yz = 2R - 2K$$

and $$h = \frac{yz}{2}$$

Figure 19:
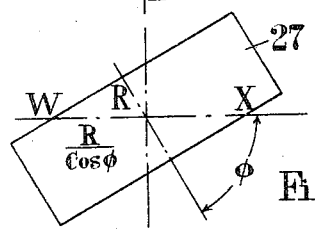

Thus it has been shown that if in Figures 1 and 19 the former 27 is set at an angle $\phi$ from zero, and the handle 16b (Figure 1) is oscillated through an angle, the cutting disc 4 will generate part of an ellipse on the stone (in the dop carried on the arm 31) in a horizontal plane, whose Major axis $= \dfrac{2R}{\cos \phi} - 2K$ and minor axis $= 2R - 2K$ The minor axis being in the same vertical plane as the centreline L—L of the stone (see Figure 21), and the axis C—C passing through the point of intersection O' of the axes of the ellipse.

Figure 23:
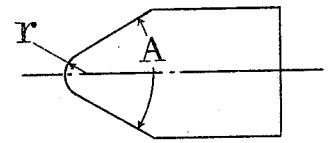
Figure 21:
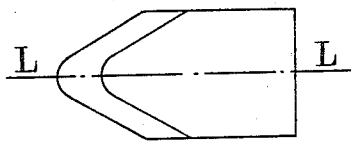
Figure 22:
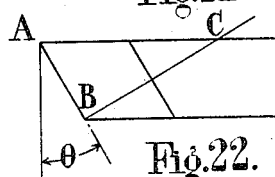

Figures 21 and 22 show the inverted plan and side elevation to which a stone is required to be shaped. The front clearance angle is $\theta$, and any horizontal plane through the side elevation must have the form shewn in Figure 23 where $r$ is the radius of the tip and A is the included nose angle.

Figure 24:
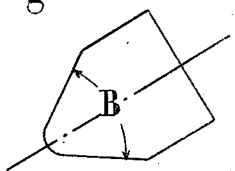

The form to which the stone must be cut shewn in Figure 24, will be the section on the line BC Figure 22 normal to the clearance angle line AB of the same figure.

The tip will be part of an ellipse whose major axis $= 2r$ and minor axis $= 2r \cos \theta$, the minor axis lying in the same vertical plane as the centre line L—L of the diamond, and the included nose angle will be B Figure 24 where—

$$\operatorname{Tan} \frac{B}{2} = \frac{\tan \frac{A}{2}}{\cos \theta} \qquad (1)$$

It has been shown that the major and minor axes of the ellipse to be generated will be:

$$\frac{2R}{\cos \phi} - 2K \text{ and } 2R - 2K \text{ respectively.}$$

therefore:

$$2r = \frac{2R}{\cos \phi} - 2K$$

and $$2r \cos \theta = 2R - 2K$$

therefore:

$$2R - 2r \cos \theta = \frac{2R}{\cos \phi} - 2r$$

therefore $$\frac{R}{\cos \phi} = R + r(1 - \cos \theta)$$

therefore $$\text{Sec } \phi = 1 + \frac{r}{R}(1 - \cos \theta) \quad (2)$$

also since $$h = \frac{yz}{2}$$

where $yz$ = the minor axis of the generated ellipse then $$h = r \cos \theta \quad (3)$$

Thus from the Formulae 1, 2 and 3 below, the machine may be set up to generate the desired profile correctly.

$$\text{Tan } \frac{B}{2} = \frac{\tan \frac{A}{2}}{\cos \theta} \quad (1)$$

$$\text{Sec } \phi = 1 + \frac{r}{R}(1 - \cos \theta) \quad (2)$$

$$h = r \cos \theta \quad (3)$$

where $r$ = radius of diamond tip.
$A$ = included nose angle of the diamond.
$\theta$ = the front clearance of the diamond.
$R$ = radius of the roller.
$B$ = the angle through which the diamond must be rotated.
$\phi$ = the angle to which the roller must be set; and
$h$ = the horizontal distance from the cutting plane of the disc to the axis C—C.

To take an example the machine may be set up to give the desired correct profile on the stone with an included nose or tip angle of 90° and a front clearance angle of 15° with a radius of .015, the diameter of the cylinder or roller being 1.000 inch.

Then from (1) above $$\text{Tan } \frac{B}{2} = \frac{\tan \frac{A}{2}}{\cos \theta}$$

$$= \frac{\tan 45°}{\cos 15°}$$

$$\therefore \frac{B}{2} = 46° \ 0'$$

$$\therefore B = 92° \ 0'$$

From (2)

$$\text{Sec } \theta = 1 + \frac{r}{R}(1 - \cos \theta)$$

$$= 1 + \frac{.015}{.500}(1 - \cos 15°)$$

$$= 1.0010224$$

$$\therefore \phi = 2° 35'$$

From (3)

$$h = r \cos \theta$$

$$= .015 \times \cos 15°$$

$$h = 0.01449''$$

I claim:
1. A machine for cutting, grinding, lapping or polishing diamonds or other stones for industrial tool work or for the jewellery trade, comprising: a machine stand; a rotary cutting disc mounted on the machine stand; a radial arm having at one end a pivotal spindle mounting on said stand with the pivotal axis arranged to afford said radial arm oscillatory arcuate movement in a plane normal to the cutting plane; a longitudinal slideway on said radial arm; a slider on said slideway; dop mounting means on said slider for holding the stone to be cut, the arrangement being such that the dop is capable of oscillation in an arcuate path about the pivotal axis of the radial arm with the stone in contact with the cutting disc; and modifying means for the arcuate path of the dop mounting means consisting of a former supported on the radial arm adjacent the pivotal axis thereof and connected to said slider; and an abutment member mounted on the machine stand adjacent to and for engagement by the former, the arrangement being such that oscillation of the radial arm rotates the former about the said pivotal axis and against the abutment member whereby the slider is displaced along said slideway of the radial arm to modify the arcuate path of the dop mounting means during said oscillation and afford cutting contact loci for the stone at the cutting disc as determined by said modifying means.

2. A machine as claimed in claim 1 wherein the former is a cylinder mounted for rotational displacement about an axis normal to the axis of the cylinder to incline the cylinder axis with respect to the axis of the pivotal mounting of the radial arm.

3. A machine as claimed in claim 1 wherein the former is maintained in contact with the abutment member by yieldable pressure means.

4. A machine as claimed in claim 1 wherein the abutment member is mounted for lengthwise reciprocation to distribute the wear effect of contact with the former.

5. A machine as claimed in claim 1 wherein an arcuate scale is positioned adjacent the outward end of the radial arm and wherein adjustable stops are mounted adjacent said scale to determine the extent of oscillation of the radial arm in both directions.

6. A machine as claimed in claim 1 wherein power drive means are provided for oscillating the radial arm, the drive being communicated through a slip-friction clutch means to the pivotal mounting of said arm.

7. A machine as claimed in claim 1 wherein mechanical means communicating drive for effecting the said oscillation of the radial arm are provided and include a worm wheel and worm acting as a rack reciprocated by a variable throw crank, the worm being adjustable to alter the setting of the oscillatory movement with respect to the angular position of the crank.

8. A machine as claimed in claim 1 wherein the dop mounting is adjustable so that the dop axis may be moved out of the central vertical plane of the radial arm to offset it to lie in a plane parallel to the central plane.

9. A machine as claimed in claim 1 wherein the dop mounting means on the radial arm is provided with additional slideways and sliders adapted to enable the dop to be adjusted in any of three planes at right-angles to one another.

10. A machine as claimed in claim 1 wherein the dop is mounted on a feed slider which in turn is carried on the said slider of the said slideway of the radial arm, and wherein are provided: resilient means adapted to urge the feed slider longitudinally of the arm towards the pivotal axis of oscillation for the purpose of feeding the stone into cutting contact with the cutting disc and adjustable micrometer holding off means to determine the feed contact.

11. A machine as claimed in claim 1 wherein the dop is mounted on a feed slider which in turn is carried on the said slider of the said slideway of the radial arm, and wherein are provided: resilient means adapted to urge the feed slider longitudinally along the arm towards the pivotal axis of oscillation for the purpose of feeding the stone into cutting contact with the cutting disc and adjustable micrometer holding off means to determine the feed contact and wherein the feed slider is adapted to receive interchangeable dop holders.

12. A machine as claimed in claim 1 wherein the dop mounting means comprise a dop holder having means for continuously revolving the dop about its axis for conical cutting or like work.

13. A machine as claimed in claim 1 wherein the dop mounting means comprise a dop holder in which the dop may be turned about its axis stepwise from one position to another for facet cutting or like work.

14. A machine as claimed in claim 1 wherein the dop is angularly adjustable in a vertical plane about a horizontal axis for cutting a clearance angled surface upon a tool stone and like purposes where a surface at an angle other than a right-angle to the longitudinal axis of the stone is to be cut.

15. In a machine as claimed in claim 1 wherein the dop is angularly adjustable in a vertical plane about a horizontal axis for cutting a clearance angle surface upon a tool stone and like purposes, and for cutting a radius having a true circular arc upon a stone with a clearance angle by canting the axis of the former to an angle appropriate for the clearance angle determined for the stone.

16. A machine having the features claimed in claim 1 wherein the said radial arm is positioned in operative association with a cutting disc rotatable about its own axis and revoluble in an orbit about a planetary axis for automatically finding the cutting grain of a diamond.

17. A machine as claimed in claim 1 wherein the said radial arm is positioned in operative association with a cutting disc rotatable about its own axis and revoluble in an orbit about a planetary axis for automatically finding the cutting grain of a diamond and wherein the mounting for the cutting disc and the planetary movement is continuously reciprocable in a plane parallel with the cutting plane of the disc to distribute the path of the contact of the stone upon the disc.

18. A machine as claimed in claim 1 wherein the pivot spindle of the radial arm has a coaxial bore through which a light beam may be projected across the contact area of the stone and cutting disc and wherein an optical magnifying device is mounted above the contact area whereby the cutting progress may be viewed while the machine is in operation.

19. A machine as claimed in claim 1 wherein the pivot spindle of the radial arm has a coaxial bore through which a light beam may be projected across the contact area of the stone and cutting disc and wherein an optical magnifying device is mounted above the contact area whereby the cutting progress may be viewed while the machine is in operation and wherein the optical device is provided with a screen having a graticule or profile image of the stone form to be generated.

20. A machine as claimed in claim 1 wherein an illuminated viewing screen is adjustably mounted laterally of the stone and cutting disc contact so that the stone may be viewed in silhouette while the machine is in operation.

FREDERICK CHARLES JEARUM.